(12) United States Patent
Hendricks

(10) Patent No.: US 9,013,558 B2
(45) Date of Patent: Apr. 21, 2015

(54) SYSTEM AND METHOD FOR ALIGNMENT OF STEREO VIEWS

(75) Inventor: Benjamin Hendricks, Sherman Oaks, CA (US)

(73) Assignees: Sony Corporation, Tokyo (JP); Sony Pictures Technologies Inc., Culver City, CA (US)

(*) Notice: Subject to any disclaimer, the term of this patent is extended or adjusted under 35 U.S.C. 154(b) by 388 days.

(21) Appl. No.: 13/539,892

(22) Filed: Jul. 2, 2012

(65) Prior Publication Data

US 2014/0002614 A1    Jan. 2, 2014

(51) Int. Cl.
*H04N 13/00* (2006.01)
*H04N 13/02* (2006.01)

(52) U.S. Cl.
CPC ....... *H04N 13/0018* (2013.01); *H04N 13/0239* (2013.01); *H04N 13/0246* (2013.01)

(58) Field of Classification Search
USPC ............................................................ 348/47
See application file for complete search history.

(56) References Cited

U.S. PATENT DOCUMENTS

| 2011/0249889 A1 | 10/2011 | Kothandaraman et al. |
| 2012/0075181 A1 | 3/2012 | Algreatly |
| 2013/0163854 A1* | 6/2013 | Cheng .......................... 382/154 |

FOREIGN PATENT DOCUMENTS

CN             102413342 A      4/2012

* cited by examiner

*Primary Examiner* — Sath V Perungavoor
*Assistant Examiner* — Jeffery Williams
(74) *Attorney, Agent, or Firm* — Mark D. Wieczorek; Mayer & Williams PC

(57) ABSTRACT

Systems and methods according to principles disclosed here provide a screen space transform, e.g., implemented as a node, that may be employed to correct alignment issues between left and right eyes of a native stereo plate. The transformations may be in a number of homographic ways, including via translation, rotation, and scaling. By properly aligning stereographic images, subsequent images are properly aligned throughout the animation pipeline. In addition, the viewer experience is significantly improved.

20 Claims, 9 Drawing Sheets

IMAGES BEFORE TRANSFORMATION(S)

IMAGES AFTER TRANFORMATION(S)

[TOP VIEW]

SYSTEM AND METHOD FOR ALIGNMENT OF STEREO VIEWS

BACKGROUND OF THE INVENTION

Movies presented in 3-D are enjoying tremendous popularity. One way of achieving three-dimensional images is by way of stereography. In stereography two images are captured and presented to a user, one from a left camera and for the left eye of a viewer, and one from a right camera and for a right eye of a viewer. Stereography is one of the oldest ways of producing a 3-D image for a viewer.

However, one complaint commonly heard from viewers of 3-D images is that viewing such often results in annoyances such as headaches or nausea. In some cases, 3-D viewing is not recommended for young children or others susceptible to visual disturbances.

Accordingly, a need exists for an improved 3-D viewing experience.

SUMMARY OF THE INVENTION

Systems and methods according to principles disclosed here provide a screen space transform, e.g., implemented as a node, that may be employed to correct alignment issues between left and right eyes of a native stereo plate. The transformations may be in a number of homographic ways, including via translation, rotation, and scaling. By properly aligning stereographic images, the viewer experience is significantly improved.

In one aspect, the invention is directed towards a method of aligning images from cameras configured for a stereoscopic view, including: in a system including a left and right camera, selecting one of the left and right cameras to be a master camera, and the other camera to be an aligned camera; comparing a vertical location of a point on an image taken by the master camera with a corresponding point on an image taken by the aligned camera, and if the vertical locations are not the same, vertically translating the image from either the master camera or the aligned camera such that the vertical locations are the same; comparing a scale of the image taken by the master camera with a scale of the image taken by the aligned camera at a point vertically offset from the point used in step b., and if the scales are not the same, then changing the scale of the image taken by either the master camera or the aligned camera such that the scales are the same; and comparing a degree of rotation of the image taken by the master camera with a degree of rotation of the image taken by the aligned camera at a point horizontally offset from the points used in steps b. and c., and if the degrees of rotation are not the same, then changing the degree of rotation of the image taken by either the master camera or the aligned camera such that the degree of rotations are the same.

Implementations of the invention may include one or more of the following. The vertically translating may be performed on the image from the aligned camera. The changing the scale may be performed on the image from the aligned camera. The changing the degree of rotation may be performed on the image from the aligned camera. The vertically translating, the changing the scale, and the changing the degree of rotation may all be performed on the image from the aligned camera. The vertically translating may be performed before the changing the scale, and the changing the scale may be performed before the changing the degree of rotation. At least one of the comparing steps may be performed by subtracting color values at the points in steps b., c., and d., corresponding to the vertical location, scale, or degree of rotation, respectively, and at least one of the respective translating or changing steps may be performed by minimizing a result of an absolute value of the subtraction of the color values. The method may further include associating a first match moving camera with the master camera and associating a second match moving camera with the aligned camera, and performing a corresponding filmback alignment operation on the second match moving camera, according to the alignment operation that was performed on images from the aligned camera. The translating and/or changing steps on images from the first or second match moving camera may be performed on images from the match moving camera associated with the camera on which the translating and/or changing steps are performed in steps 1b, 1c, or 1d, respectively. The comparing a vertical location may include detecting a key point in the image from the master camera and comparing the key point to a corresponding key point in the image from the aligned camera. The comparing a scale may include measuring a distance between two key points in the image from the master camera and comparing the measured distance to a corresponding distance between two corresponding key points in the image from the aligned camera. The comparing a degree of rotation may include measuring an angle between two key lines in the image from the master camera and comparing the measured angle to an angle between two corresponding key lines in the image from the aligned camera. Each key line may be defined by two key points.

In another aspect, the invention is directed towards a non-transitory computer readable method, including instructions for causing a computing environment to perform the above method.

In a further aspect, the invention is directed towards a computing environment for modifying stereographic images, the computing environment including: memory including instructions for selecting one of a set of left and right cameras to be a master camera, and the other camera to be an aligned camera; memory including instructions for comparing a vertical location of a point on an image taken by the master camera with a corresponding point on an image taken by the aligned camera, and if the vertical locations are not the same, vertically translating the image from either the master camera or the aligned camera such that the vertical locations are the same; memory including instructions for comparing a scale of the image taken by the master camera with a scale of the image taken by the aligned camera, and if the scales are not the same, then changing the scale of the image taken by either the master camera or the aligned camera such that the scales are the same; and memory including instructions for comparing a degree of rotation of the image taken by the master camera with a degree of rotation of the image taken by the aligned camera, and if the degrees of rotation are not the same, then changing the degree of rotation of the image taken by either the master camera or the aligned camera such that the degree of rotations are the same.

Implementations of the invention may include one or more of the following. The memory instructions may be configured such that the vertically translating occurs before the changing the scale, and where the changing the scale occurs before the changing the degree of rotation. The computing environment may further include a memory including instructions for providing a difference visualization, where the difference visualization illustrates results of a subtraction, a minuend of the subtraction being a value of a vertical location, a scale, or a degree of rotation, of the image taken by the master camera, and a subtrahend of the subtraction being a value of a vertical location, a scale, or a degree of rotation, respectively, of the image taken by the aligned camera. The computing environment may further include a memory including instructions for providing a difference visualization, where the difference visualization illustrates results of a subtraction, a minuend of the subtraction being a pixel value at a pixel of the image taken by the master camera, and a subtrahend of the subtraction being a pixel value at a corresponding pixel of the image taken by the aligned camera. The computing environment may further include a memory including instructions for associating a first match moving camera with the master camera and associating a second match moving camera with the aligned camera, and performing the translating and/or changing steps on images from the first or second match moving cameras, or both. The computing environment may be such that the translating and/or changing steps on images from the first or second match moving cameras are performed on images from the match moving camera associated with the camera on which the translating and/or changing steps are performed in the memories in elements 1b, c, or 1d, respectively.

Advantages of the invention may include one or more of the following. The systems and methods according to principles disclosed here achieve superior results in stereography, and avoid the problems encountered in the prior art. The systems and methods may be employed immediately after stereographic plates or images are obtained, and directly after match move information is obtained if necessary, thereby allowing alignment and analysis of the shot to be made without the deleterious effects encountered in prior systems, e.g., headaches due to misalignments. For example, the systems and methods may be employed well before final compositing, allowing the properly aligned shots to be employed during production. In other words, the visual benefits are not just for the final viewer but also for all those involved in production.

Other advantages will become apparent from the description that follows, including the claims and drawings.

BRIEF DESCRIPTION OF THE DRAWINGS

Like reference numerals refer to like elements throughout.

DETAILED DESCRIPTION

Figure 1:
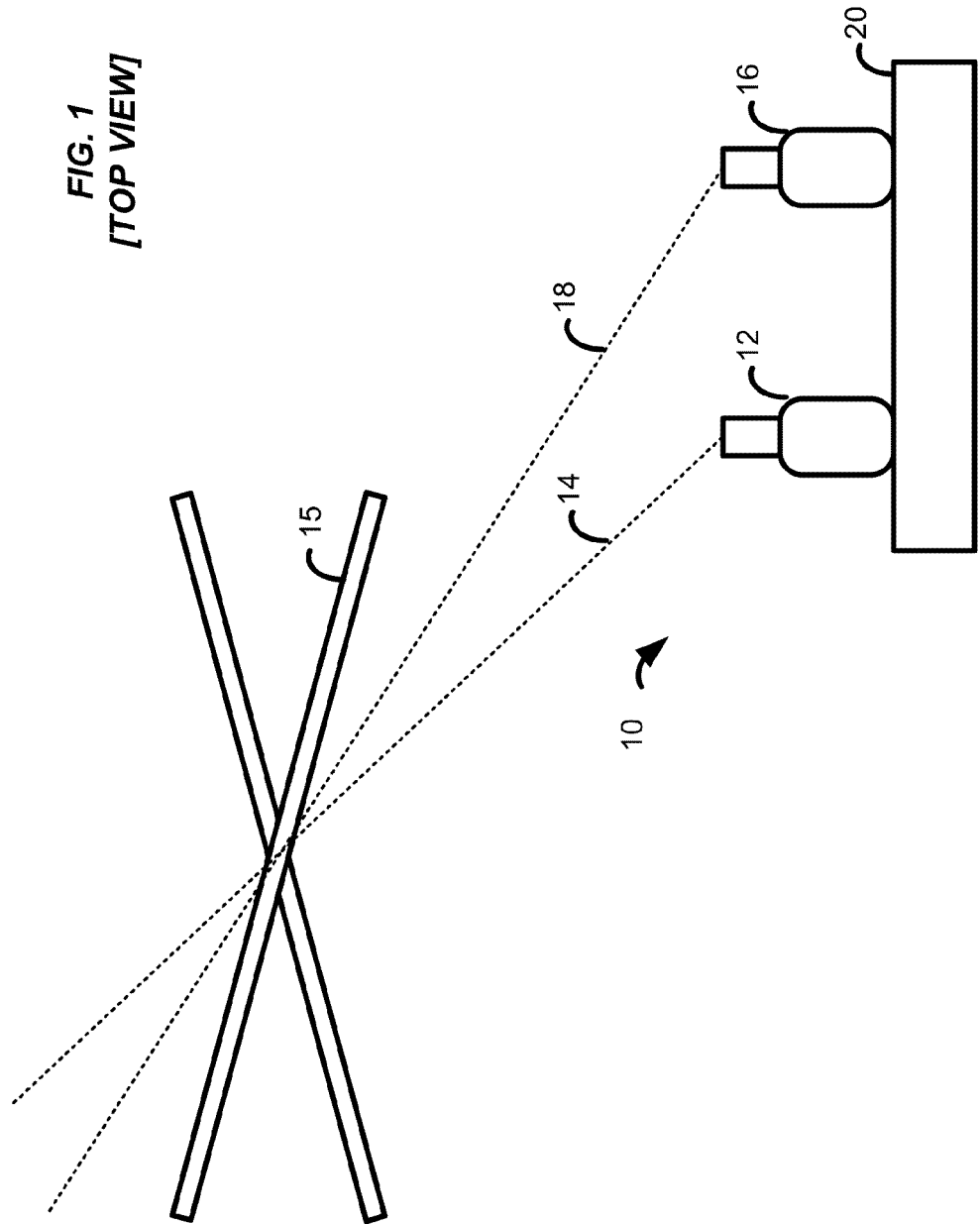
FIG. 1 illustrates an idealized top view of a stereographic camera system viewing a target.

FIG. 1 illustrates a top view of a stereographic camera arrangement 10 according to present principles. In the figure, two cameras 12 and 16 are imaging a target 15. To maintain a constant position, the cameras 12 and 16 are positioned on a mount 20. The camera 12 has a line of sight 14 to the target 15 and the camera 16 has a line of sight 18 to the same.

In such a system, the left eye and right eye of a viewer are presented with different views of the target, thereby creating the illusion of depth in binocular vision. Such systems may then be combined with various types of 3-D imaging to create, e.g., 3-D movies.

Figure 2:
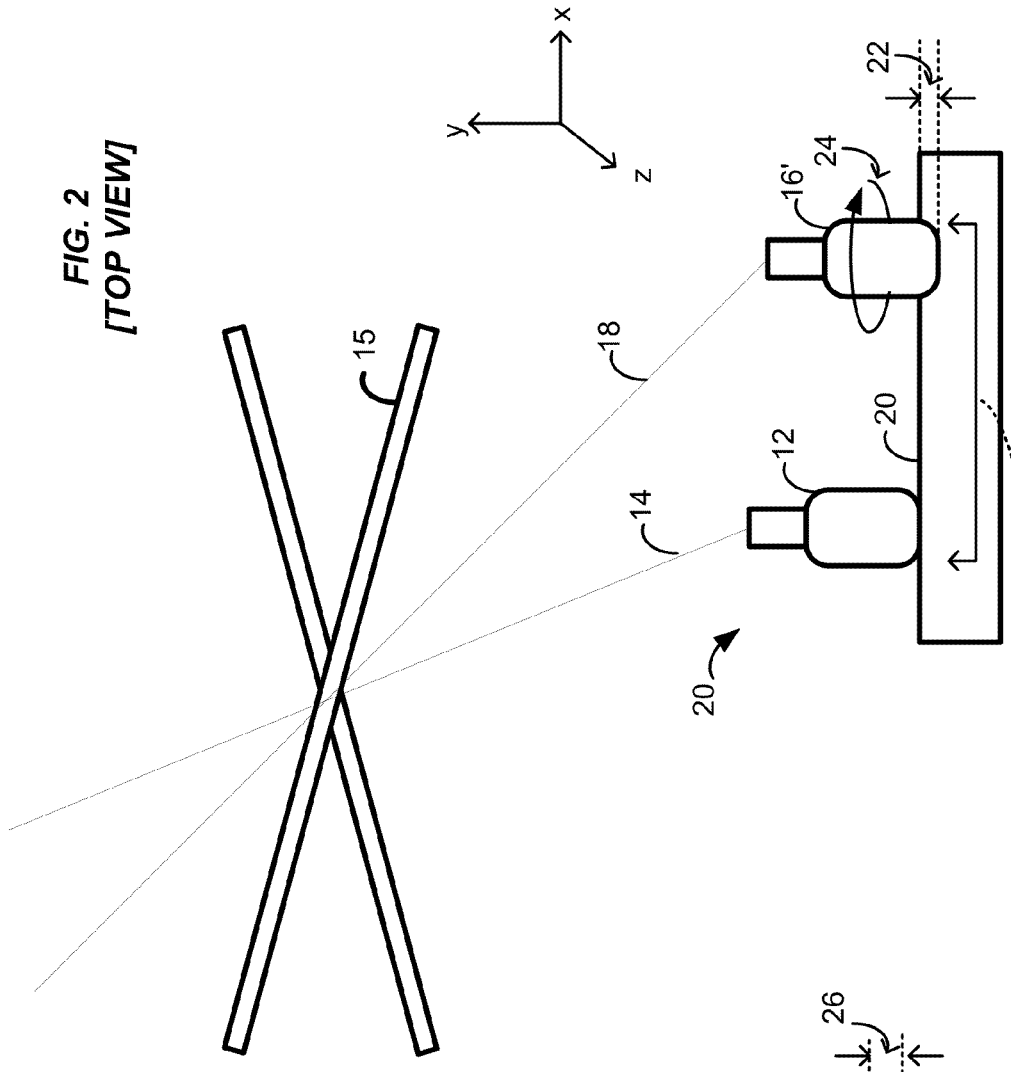
FIG. 2 illustrates a common situation where a stereographic camera system is viewing a target.

FIG. 1 is an idealized situation. FIG. 2 illustrates a more usual situation encountered. In the system 20 of FIG. 2, a target 15 is being visualized or photographed by the first or left camera 12 and a second or right camera 16'. In FIG. 2, the camera 12 is illustrated as being properly positioned on a mount 20, while the camera 16' is illustrated with various positioning errors. It will be understood that positioning errors may occur on either of the cameras. In any case, the camera 12 has a line of sight 14 to the target 15 while the camera 16' has a line of sight 18 to the target 15.

Either of the cameras may be designated as a master camera, in which case its position, including vertical location, scale, and degree of rotation, are arbitrarily accepted as being correct. In some of the exemplary illustrations below, the left camera is considered to be the master camera and the right camera is considered the camera to be aligned, or simply "aligned camera". It will be understood, however, that this is a matter of convention, in that either camera may be considered the master camera. In many cases, if one or more of the images from one camera in a particular scene are not acceptable for some reason, the other camera may be viewed as the master, at least for that scene. A given movie may have the left camera be the master for one set of scenes, and the right camera be the master for another set of scenes.

For ease of explanation, FIG. 2 also illustrates a three-dimensional Cartesian coordinate system x-y-z. The plane of the cameras and thus that of the resulting images is the x-z plane. The various errors that may occur, which are addressable by systems and methods disclosed here, are described with respect to these axes and planes.

FIG. 2 illustrates a scaling distance 22, which illustrates an additional distance away from the target 15 that the camera 16' is subject to that the camera 12 is not. In other words, camera 16' is farther away from the target 15 by an amount 22 as compared to the camera 12. By being farther away, i.e., along the y-axis, the scale of the image as depicted by the camera 16' is different from the scale of the image as depicted by the camera 12.

A similar error may occur by virtue of lens differences between the camera 12 and the camera 16'. In other words, even the same model of camera may encounter variations in scale due to lens differences inherent in manufacturing.

According to principles disclosed here, these scaling image variations may be remedied by the disclosed systems and methods, avoiding the expensive and highly inconvenient necessity of retaking the entire shot or scene. In the case of the distance 22, the same may be remedied by a scaling transformation, which essentially resizes the entire image to account for differences in scale.

FIG. 2 also illustrates a degree of rotation 24, which represents a rotation that the camera 16' is subject to that the camera 12 is not. In other words, the camera 16' is rotated with respect to the target 15 by an amount 24 as compared to the camera 12. By being rotated, i.e., about the y-axis, the image from the left camera and the image from the right camera are not rotationally aligned. A visualization of the two, e.g., subtracting pixel values of one from the other, would generally illustrate the situation by depicting a number of nonzero or non-black pixel values.

According to principles disclosed here, these image variations may be remedied using the disclosed systems and methods, by rotating one image with respect to the other. In the arrangements here, an image from the aligned camera is rotated with respect to an image from the master camera in such a way that the difference between the two images is minimized.

Also shown in the inset portion of FIG. 2 is a side view, illustrating the effect of a vertical translation or offset 26 between the camera 12 and the camera 16'. In other words, the vertical locations of the cameras in many cases differ slightly and thus the vertical locations of the corresponding images from these cameras are likewise different.

Figure 3:
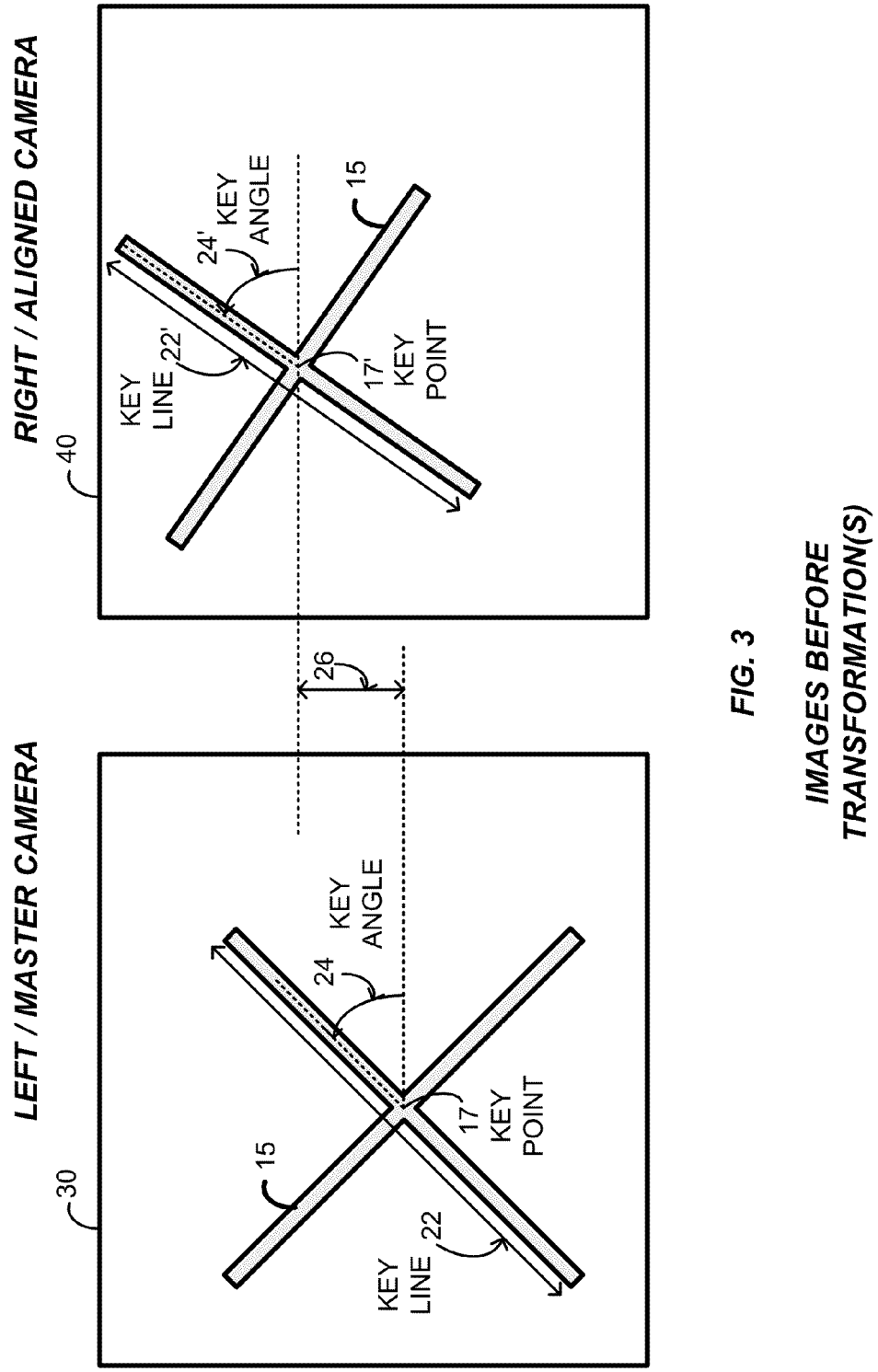
FIG. 3 illustrates left and right images from respective left and right stereographic cameras, showing a difference in the images due to non-idealized camera location and lensing.

Referring to FIG. 3, an image 30 from a master camera is illustrated next to an image 40 from a camera to be aligned, as noted above termed an "aligned camera". The same target 15 has been imaged in each camera, and the target is naturally offset in a horizontal direction due to the horizontal displacement of the stereographic cameras. Various other distinctions between the images are also illustrated, these noted by the same reference numerals as in FIG. 2. For example, the target 15 in the image 40 is vertically offset a distance 26 relative to the target 15 in the image 30. In other words, the vertical locations of the target differ between the images. One way of measuring the difference in vertical locations is by measuring the distance between key points on the target. For example, a key point 17 is shown in the image 30, and the equivalent key point is shown at location 17' in the image 40, offset by the vertical distance 26. By measuring the vertical distance 26, the amount of translation needed for the image 40, in the vertical direction, becomes known.

In the same way, a degree of rotation needed for alignment may be determined by measuring an angle 24 of a representative or key line in the image. For example, the angle 24 of a target feature has been measured in the image 30, while the equivalent feature in the image 40 measures 24'. Thus, to align the images, the image 40 must be rotated by an amount (angle 24'-angle 24).

Similarly, a degree of scaling needed for alignment may be determined by measuring the length of the key line 22 in the image. In FIG. 3, the image 30 has a key line 22 that may be measured, while the equivalent feature in the image 40 is a key line 22'. In the example of FIG. 3, the scaling required of the image 40 would be greater than unity, in order to align the image from the master camera with the image from the aligned camera.

Figure 4:
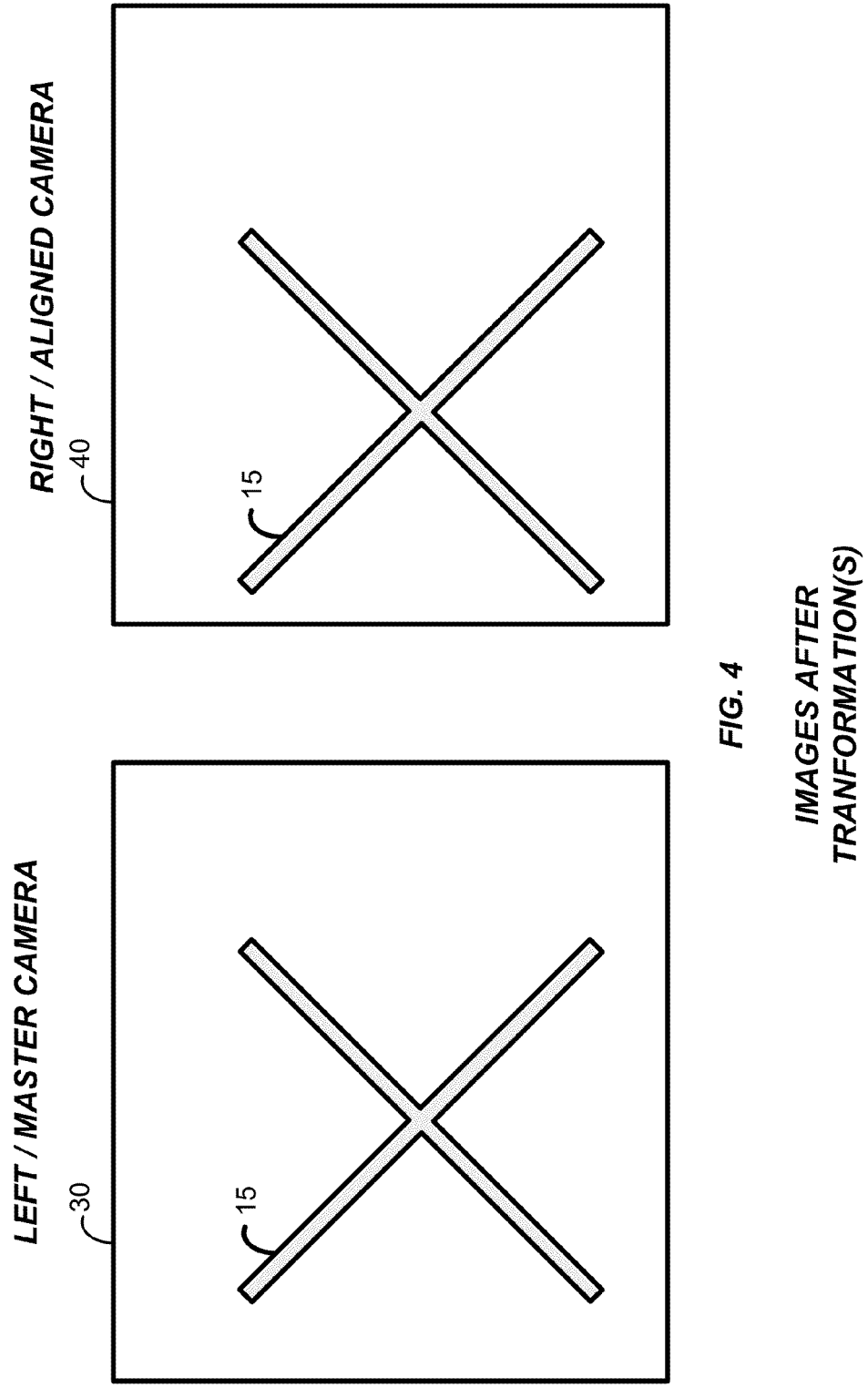
FIG. 4 illustrates left and right images from respective left and right stereographic cameras, following application of systems and methods according to the principles disclosed here.

FIG. 4 illustrates the same images 30 and 40 visualizing the target 15, after the transformation for alignment steps have been taken. The target 15 in the image 40 is still horizontally displaced from the target 15 in the image 30, but such is due to the horizontal displacement of the cameras, not errors in camera positioning, and such is required for a stereographic view. The greater the horizontal displacement, the greater the depth of field achievable by the stereographic system.

Figure 5:
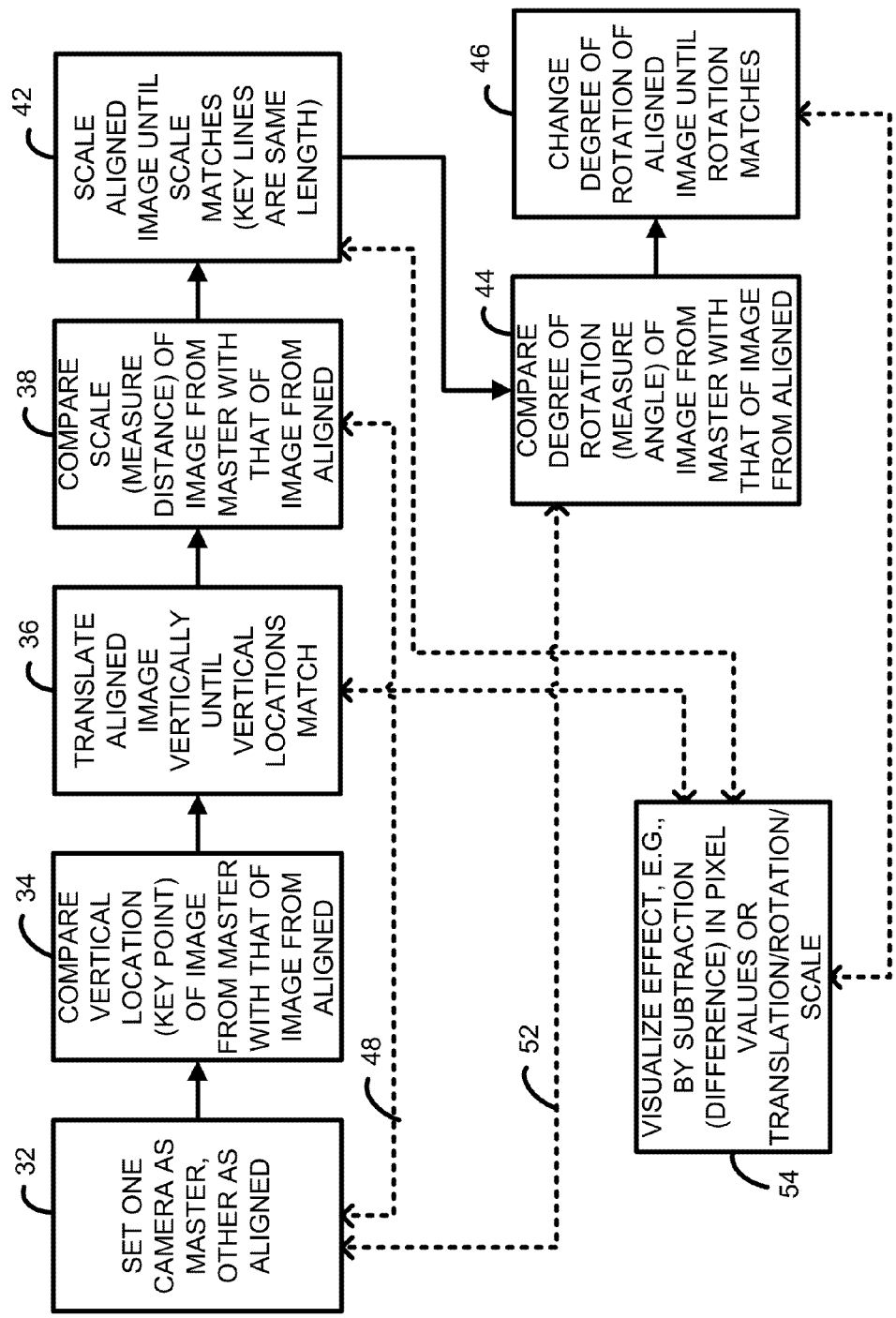
FIG. 5 is a flowchart illustrating an exemplary method according to principles disclosed here.

FIG. 5 is a flowchart 50 of one implementation of a method according to the principles described here. A first step is that one camera of a set of two stereographic cameras is set as a master camera, and the other as an aligned camera (step 32). In this application, the left camera has been set as the master camera, and the right camera as the aligned camera. However, in other applications, the two may be switched. In some cases, the choice of master camera can vary between shots.

A next step is that a vertical location of an image from the master camera is compared with that of an image from the aligned camera (step 34). Generally this means comparing a key point in one image to a corresponding key point in the other. This step may be performed first, before other transformations. Once the difference between vertical locations on the images is determined, the aligned image may be translated vertically until the vertical locations of the key points match (step 36).

A next step is to compare a scale of the image from the master camera with that of the image from the aligned camera (step 38). For example, the length of a key line or key feature of the image from the master camera may be measured and compared with the length of the corresponding feature as imaged by the aligned camera.

Once the difference in scale has been determined, the image from the aligned camera may be scaled until its scale matches that of the image from the master camera (step 42). For example, scaling may occur until the distance of key lines or key features are the same. In a specific example, if a key feature measures an arbitrary value of 1.1 in an image from the master camera and 1.0 in an image from the aligned camera, i.e., the aligned camera is farther away from the visualized feature than the master camera, then the image from the aligned camera should be increased in size or scale by 10%.

A next step is to compare a degree of rotation of the image from the master camera with that of the image from the aligned camera (step 44). For example, a key line may take a certain angle with respect to a vertical or horizontal line in the image from the master camera, and the corresponding angle may be measured from the respective vertical or horizontal in the image from the aligned camera. Where the angles are different, the amount of difference may be measured and thus determined.

Once determined, the image from the aligned camera may be rotated by the determined amount until its image is unrotated with respect to the image from the master camera, e.g., the key line angles from the vertical or horizontal are the same for the corresponding key lines in both images.

The above method provides a series of homographic transformations that result in an image properly aligned for stereography. The steps may be performed automatically, by minimizing differences measured and calculated for vertical location, key line angles, or key line distances. Alternatively, differences in pixel values may be used and minimized in an automatic fashion. In yet another implementation, a user interface may be provided with a mode whereby an animator can visualize a difference in pixel values (step 54), and by adjusting the vertical position, amount of rotation, or scale, of the image from the aligned camera, the animator can manually determine proper alignment by seeing what position gives a minimized result of the subtraction, where pixel values of the image from the master camera act as the minuend and pixel values of the image from the aligned camera serve as the subtrahend. Besides minimizing a difference of pixel values, it will be understood that the animator can work directly on values of vertical position, amount of rotation, or scale.

Due to the horizontal displacement of stereographic cameras, subtracting one image from another will not generally result in a black image, i.e., with zero or no values remaining Still, an animator can visualize where differences are locally minimized and thus where alignment has been substantially achieved. In another method, key areas of pixels may be aligned, either automatically or by a user manually. The key areas of pixels may be areas where significant contrast is seen, where easily identifiable vertical translations or rotations are evident, where a characteristic length is clearly scaled smaller or larger, or the like, and thus where alignment may be most easily determined. Other such areas include bright/dark spots, edges, and corners. In most cases, such points that are stationary in the image provide desirable points.

It is further noted that reference numerals 48 and 52 indicate lines for optional steps where between different transformations, different cameras are set as master and aligned cameras. In other words, while generally the same camera serves as the master camera for all transformations in a given shot, the same is not strictly required and the stereographic cameras may trade roles between transformations.

Figure 6:
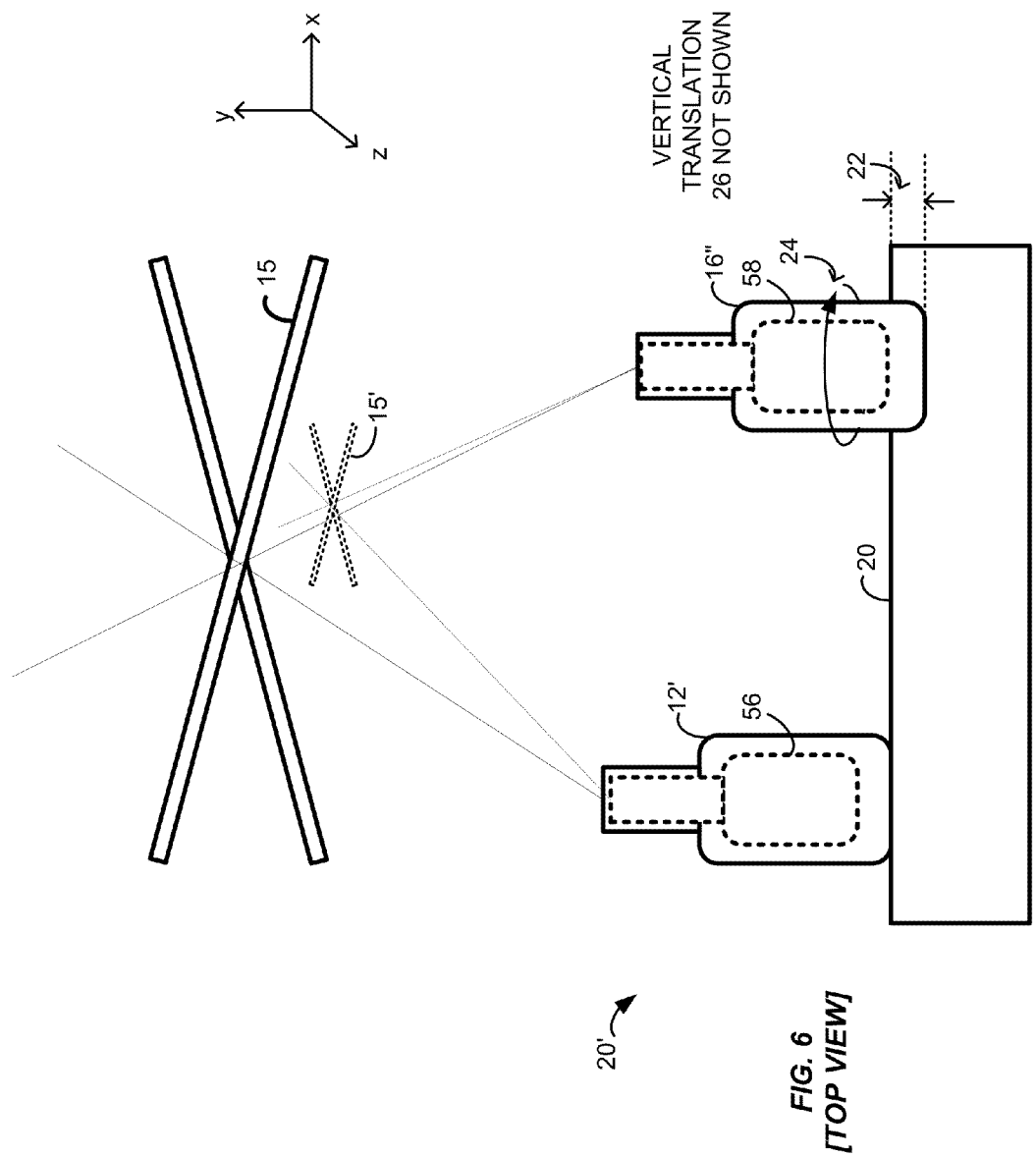
FIG. 6 illustrates a situation similar to FIG. 2, but where virtual match moving rendering cameras are also employed.

FIG. 6 shows a top view of another exemplary system 20' where cameras 12' and 16" are illustrated imaging a target 15. The cameras 12' and 16" are positioned on a mount 20. As described above, various transformations are shown to account for a scaling difference 22 and a rotational difference 24. Vertical translations are not shown, but the same would be out of the plane of the page along axis z.

Also shown in FIG. 6 is a virtual target 15' which may be a computer-generated object rendered by a left match moving camera 56 and a right match moving camera 58. The left and right match moving cameras may be employed in the following way.

First it is noted that the screen space alignments of FIGS. 2-5 may be performed in a compositing package, the results of which are properly aligned stereographic plates. The alignment transformation data may also be provided to a computer-generated object pipeline, e.g., implemented in Maya®. The alignment transformation data, also called alignment attributes, may be converted to equivalent film-backed transformations which may be applied to a corresponding eye of the match moved virtual camera. This ensures that any CG renders created for the shot are aligned, i.e., between left and right eye, in the same way that the stereographic plates have been aligned.

As is known, the technique of match moving allows virtual objects to appear in physical video footage by aligning such objects with a feature, e.g., a stationary key feature, in the photographed environment. By creating a time evolution curve for such virtual objects, they can appear to move in the photographed environment in a physically realistic way. By compositing the images from the film-backed master and aligned cameras with the CG rendering, the virtual objects appear in the video. However, virtual objects will suffer from the same problems as real objects since the CG camera follows the alignment of the physical camera, including its misalignments, as the match move curve is based on points determined using the film-backed camera. Accordingly, transformations determined for the physical camera images should also be applied to the corresponding CG camera images.

Figure 7:
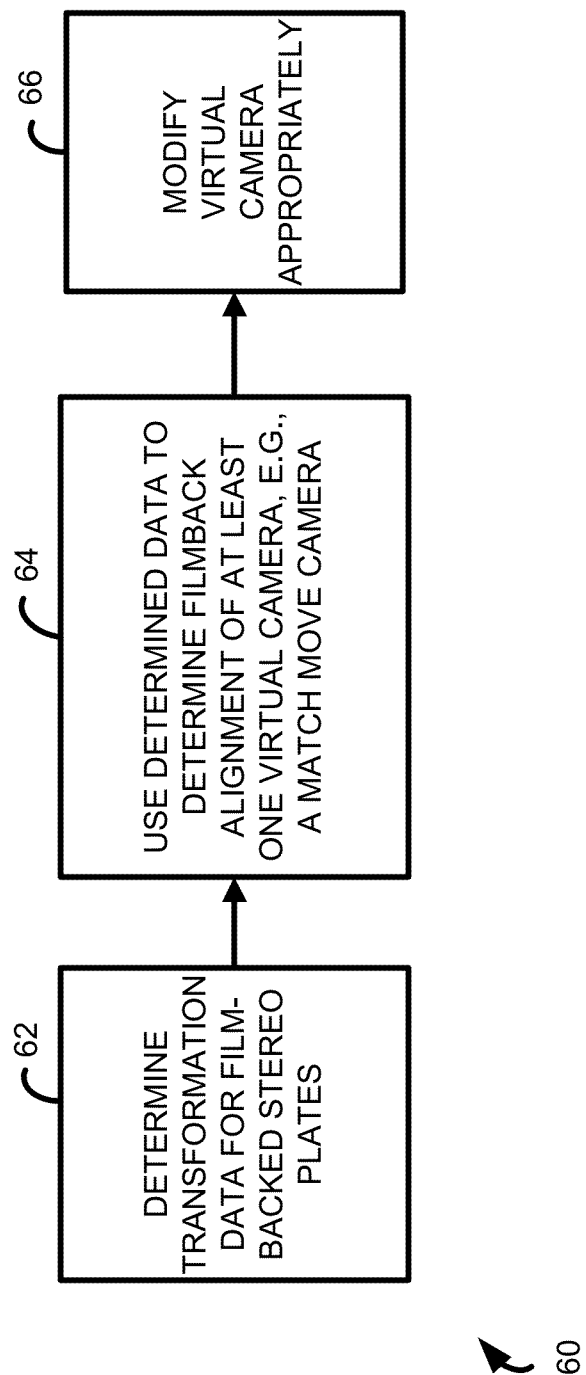
FIG. 7 is a flowchart illustrating another exemplary method according to principles disclosed here.

Referring to the flowchart 60 of FIG. 7, a first step is to determine the necessary transformation data for the film-backed stereo plates (step 62). This first step is essentially described above with respect to FIGS. 2-6. A next step is to use that determined data to modify the alignment of at least one virtual camera (step 64). One such camera may be, e.g., a match move camera.

This can be done in a number of ways. One such way is to directly apply the transformation to the corresponding match move camera. For example, if the transformation has been determined with respect to a "right" aligned camera, the transformation may be applied to the right match move camera. In another way, if the transformation has been determined with respect to a right aligned camera, an inverse transformation may be applied to the left match move camera. In any case, the virtual camera is modified according to the appropriate transformation (step 66).

Figure 8:
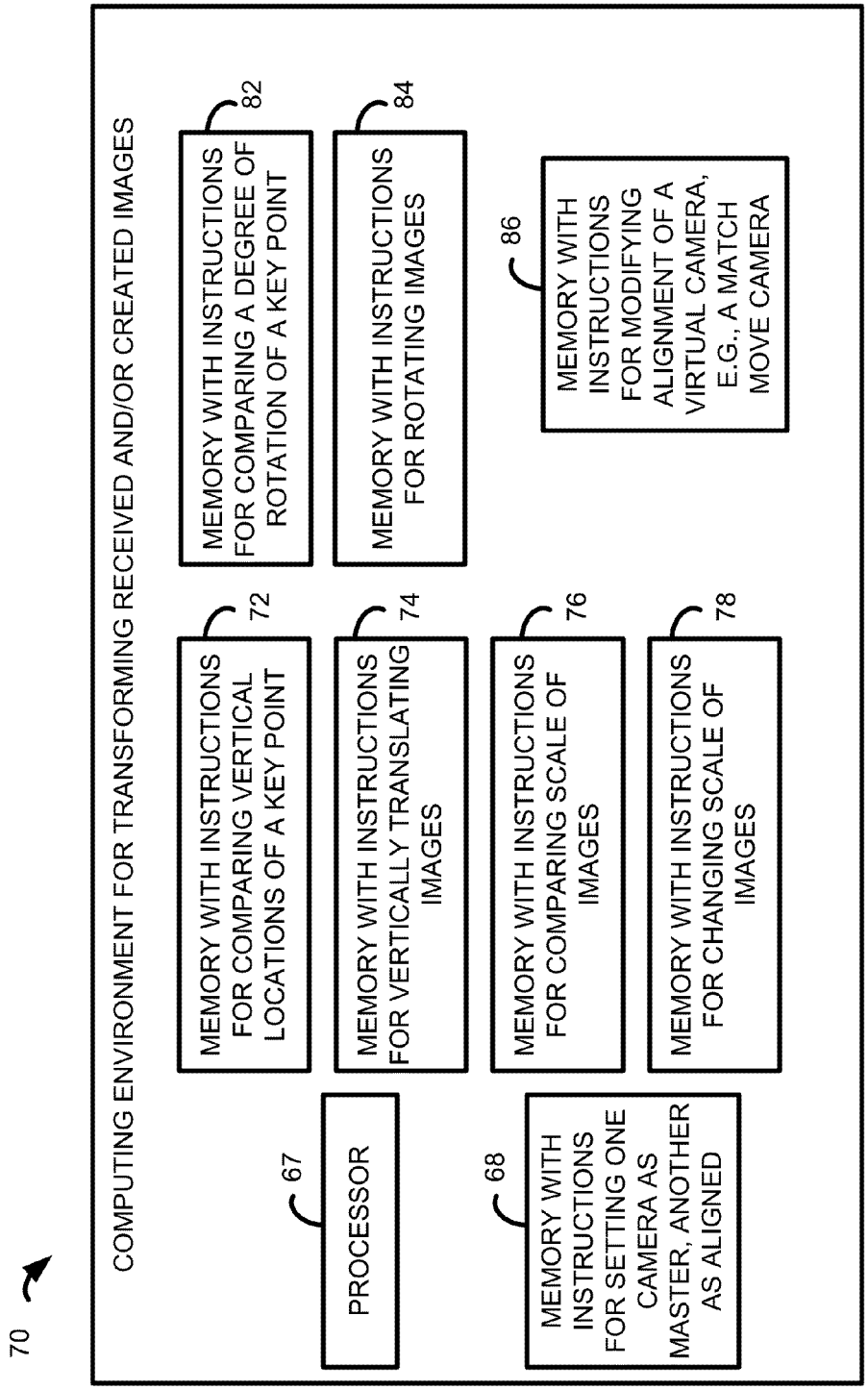
FIG. 8 illustrates an exemplary computing environment for performing certain methods according to principles disclosed here.

FIG. 8 illustrates an exemplary computing environment 70 for transforming received and/or created stereographic images. The computing environment 70 includes a processor 67 and memory 68 having instructions for setting one camera as a master camera, and the other as an aligned camera. The memory, like others disclosed here, is typically non-transitory or communicates with non-transitory storage, and may also be used for switching the roles of the cameras. The computing environment 70 further includes memory 72 having instructions for comparing vertical locations of a key point or points between the image from the master camera and the image from the aligned camera. This memory thus determines how much of a vertical translation is required to align the images, at least vertically. The computing environment 70 further includes memory 74 comprising instructions for performing the vertical translation of the images. As noted, typically one image will be vertically translated with respect to the other, although in some exceptional cases both images may undergo vertical translation.

The computing environment further includes memory 76 including instructions for comparing a scale of images. The memory 76 may, e.g., measure a characteristic distance in the images, that of a key feature or the like. Once determined, if a change of scale is required, the memory 78 includes instructions for changing the scale of the images, typically one to match a length scale of the other. However, in some cases, both images may be altered (which is true of all transformations described).

The computing environment 70 further includes a memory 82 including instructions for comparing a degree of rotation of the images. This memory may, e.g., compare the angle of a characteristic line with the horizontal or vertical. Once determined, a memory 84 may be invoked with instructions for rotating one image with respect to the other, and thus aligning the images in rotation.

The computing environment 70 further includes a memory 86 comprising instructions for modifying the alignment of a virtual camera. Such a virtual camera may be, e.g., a match move camera. This memory 86 essentially takes the alignment transformation data from the master and aligned cameras and applies the same to rendering CG virtual cameras. The memory 86 may include instructions for modifying one or both (or more) virtual cameras.

Systems and methods have been described to provide a convenient screen space transform node used to correct vertical alignment issues between left and right eyes of a native stereo plate, including a "visualize mode" that toggles to "difference" to aid in the alignment of key areas of pixels for precise alignment. Systems and methods according to principles disclosed here avoid many of the deleterious effects of prior stereoscopic vision systems. For example, annoyances for the viewer such as headaches may be minimized, as are caused by misaligned images. Even more fundamentally, two matching aligned images are then achieved for every frame for every stage of review after the alignment. For example, when a stereo shot is being reviewed at any stage, e.g., layout, animation, or the like, after the above described stereo alignment, the images will be aligned, at least with respect to the errors that are curable by the above. On the other hand, if, e.g., a cure was not performed by the compositing stage, then it would not be possible to tell where misalignment in images occurred, i.e., at what stage. Thus, the disclosed alignment method and system allows for consistent quality control of image data through the pipeline.

Variations of the systems and methods will also be understood. For example, while the left camera has been designated as a "master" in most of the description, the right stereographic camera may also serve this purpose, either entirely or for any given shot or scene. In a very specific set of transformations, one method may include aligning toward one corner of the screen using a vertical offset transformation, then checking a vertically-opposite corner and tuning the scale parameter, then checking a diagonally opposite corner to determine an amount of rotation needed. Doing these steps, in this order, has been found to be an effective and efficient way for achieving alignment of stereographic plates. Other such variations will also be understood.

Figure 9:
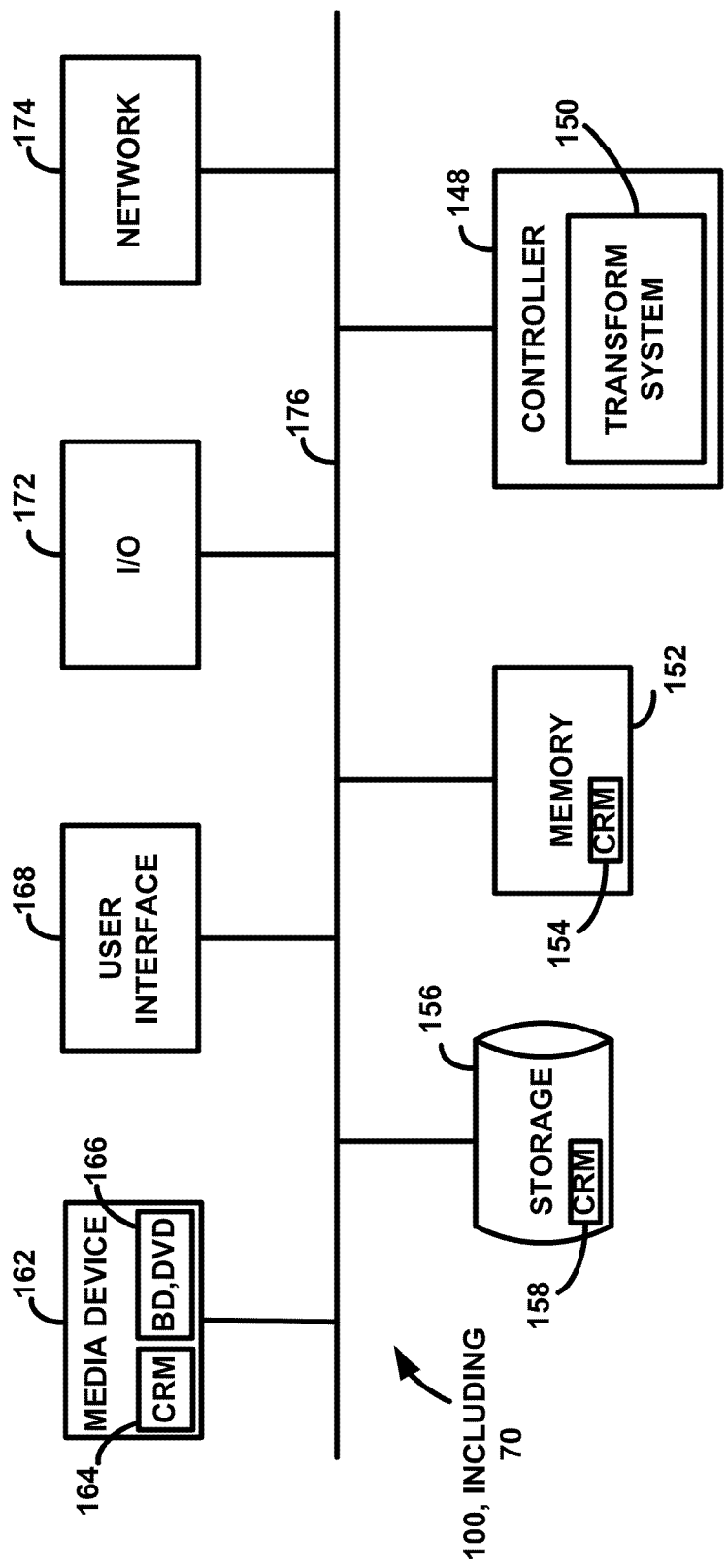
FIG. 9 illustrates another exemplary computing environment for performing certain methods according to principles disclosed here.

One implementation includes one or more programmable processors and corresponding computing system components to store and execute computer instructions, such as to execute the code that provides the various transformation functions disclosed and discussed above. Referring to FIG. 9, a representation of an exemplary computing environment 100 is illustrated, which may represent one or more computing environments, including computing environment 70.

The computing environment 100 includes a controller 148, a memory 152, storage 156, a media device 162, a user interface 168, an input/output (I/O) interface 172, and a network interface 174. The components are interconnected by a common bus 176. Alternatively, different connection configurations can be used, such as a star pattern with the controller at the center.

The controller 148 includes a programmable processor and controls the operation of the computing environment and its components. The controller 148 loads instructions from the memory 152 or an embedded controller memory (not shown) and executes these instructions to control the transformation system 150.

Memory 152, which may include non-transitory computer-readable memory 154, stores data temporarily for use by the other components of the system. In one implementation, the memory 152 is implemented as DRAM. In other implementations, the memory 152 also includes long-term or permanent memory, such as flash memory and/or ROM.

Storage 156, which may include non-transitory computer-readable memory 158, stores data temporarily or long-term for use by other components of the computing environment, such as for storing data used by the system. In one implementation, the storage 156 is a hard disc drive or a solid state drive.

The media device 162, which may include non-transitory computer-readable memory 164, receives removable media and reads and/or writes data to the inserted media. In one implementation, the media device 162 is an optical disc drive or disc burner, e.g., a writable Blu-ray® disc drive 166.

The user interface 168 includes components for accepting user input, e.g., the user indications of transformations and the like (although it is noted that in some arrangements, the transformations may be automated). In one implementation, the user interface 168 includes a keyboard, a mouse, audio speakers, and a display. The controller 148 uses input from the user to adjust the operation of the computing environment.

The I/O interface 172 includes one or more I/O ports to connect to corresponding I/O devices, such as external storage or supplemental devices, e.g., a printer or a PDA. In one implementation, the ports of the I/O interface 172 include ports such as: USB ports, PCMCIA ports, serial ports, and/or parallel ports. In another implementation, the I/O interface 172 includes a wireless interface for wireless communication with external devices.

The network interface 174 allows connections with the local network and includes a wired and/or wireless network connection, such as an RJ-45 or Ethernet connection or WiFi interface (802.11). Numerous other types of network connections will be understood to be possible, including WiMax, 3G or 4G, 802.15 protocols, 802.16 protocols, satellite, Bluetooth®, or the like.

The computing environment may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

The present invention has been described with respect to specific arrangements, which have been presented merely as exemplary ways of implementing systems and methods according to the principles disclosed here. Accordingly, the present invention is not limited to only those arrangements described above.

The invention claimed is:

1. A method of aligning images from cameras configured for a stereoscopic view, comprising:
   a. in a system comprising a left and right camera, selecting one of the left and right cameras to be a master camera, and the other camera to be an aligned camera;
   b. comparing a vertical location of a point on an image taken by the master camera with a corresponding point on an image taken by the aligned camera, and if the vertical locations are not the same, vertically translating the image from either the master camera or the aligned camera such that the vertical locations are the same;
   c. comparing a scale of the image taken by the master camera with a scale of the image taken by the aligned camera at a point vertically offset from the point used in step b., and if the scales are not the same, then changing the scale of the image taken by either the master camera or the aligned camera such that the scales are the same; and
   d. comparing a degree of rotation of the image taken by the master camera with a degree of rotation of the image taken by the aligned camera at a point horizontally offset from the points used in steps b. and c., and if the degrees of rotation are not the same, then changing the degree of rotation of the image taken by either the master camera or the aligned camera such that the degree of rotations are the same.

2. The method of claim 1, wherein the vertically translating is performed on the image from the aligned camera.

3. The method of claim 1, wherein the changing the scale is performed on the image from the aligned camera.

4. The method of claim 1, wherein the changing the degree of rotation is performed on the image from the aligned camera.

5. The method of claim 1, wherein the vertically translating, the changing the scale, and the changing the degree of rotation are all performed on the image from the aligned camera.

6. The method of claim 1, wherein the vertically translating is performed before the changing the scale, and wherein the changing the scale is performed before the changing the degree of rotation.

7. The method of claim 1, wherein at least one of the comparing steps is performed by subtracting color values at the points in steps b., c., and d., corresponding to the vertical location, scale, or degree of rotation, respectively, and wherein at least one of the respective translating or changing steps are performed by minimizing a result of an absolute value of the subtraction of the color values.

8. The method of claim 1, further comprising associating a first match moving camera with the master camera and associating a second match moving camera with the aligned camera, and performing a corresponding filmback alignment operation on the second match moving camera, according to the alignment operation that was performed on images from the aligned camera.

9. The method of claim 8, wherein the translating and/or changing steps on images from the first or second match moving camera are performed on images from the match moving camera associated with the camera on which the translating and/or changing steps are performed in steps 1b, 1c, or 1d, respectively.

10. The method of claim 1, wherein the comparing a vertical location includes detecting a key point in the image from the master camera and comparing the key point to a corresponding key point in the image from the aligned camera.

11. The method of claim 1, wherein the comparing a scale includes measuring a distance between two key points in the image from the master camera and comparing the measured distance to a corresponding distance between two corresponding key points in the image from the aligned camera.

12. The method of claim 1, wherein the comparing a degree of rotation includes measuring an angle between two key lines in the image from the master camera and comparing the measured angle to an angle between two corresponding key lines in the image from the aligned camera.

13. The method of claim 12, wherein each key line is defined by two key points.

14. A non-transitory computer readable method, comprising instructions for causing a computing environment to perform the method of claim 1.

15. A computing environment for modifying stereographic images, the computing environment comprising:
   a. memory comprising instructions for selecting one of a set of left and right cameras to be a master camera, and the other camera to be an aligned camera;
   b. memory comprising instructions for comparing a vertical location of a point on an image taken by the master camera with a corresponding point on an image taken by the aligned camera, and if the vertical locations are not the same, vertically translating the image from either the master camera or the aligned camera such that the vertical locations are the same;
   c. memory comprising instructions for comparing a scale of the image taken by the master camera with a scale of the image taken by the aligned camera, and if the scales are not the same, then changing the scale of the image taken by either the master camera or the aligned camera such that the scales are the same; and
   d. memory comprising instructions for comparing a degree of rotation of the image taken by the master camera with a degree of rotation of the image taken by the aligned camera, and if the degrees of rotation are not the same, then changing the degree of rotation of the image taken by either the master camera or the aligned camera such that the degree of rotations are the same.

16. The computing environment of claim 15, wherein the memory instructions are configured such that the vertically translating occurs before the changing the scale, and wherein the changing the scale occurs before the changing the degree of rotation.

17. The computing environment of claim 15, further comprising a memory comprising instructions for providing a difference visualization, wherein the difference visualization illustrates results of a subtraction, a minuend of the subtraction being a value of a vertical location, a scale, or a degree of rotation, of the image taken by the master camera, and a subtrahend of the subtraction being a value of a vertical location, a scale, or a degree of rotation, respectively, of the image taken by the aligned camera.

18. The computing environment of claim 15, further comprising a memory including instructions for providing a difference visualization, wherein the difference visualization illustrates results of a subtraction, a minuend of the subtraction being a pixel value at a pixel of the image taken by the master camera, and a subtrahend of the subtraction being a pixel value at a corresponding pixel of the image taken by the aligned camera.

19. The computing environment of claim 15, further comprising a memory including instructions for associating a first match moving camera with the master camera and associating a second match moving camera with the aligned camera, and performing the translating and/or changing steps on images from the first or second match moving cameras, or both.

20. The computing environment of claim 19, wherein the translating and/or changing steps on images from the first or second match moving cameras are performed on images from the match moving camera associated with the camera on which the translating and/or changing steps are performed in the memories in elements 1b, 1c, or 1d, respectively.

* * * * *